(12) United States Patent
Hognaland et al.

(10) Patent No.: US 10,294,025 B2
(45) Date of Patent: May 21, 2019

(54) ROBOT FOR TRANSPORTING STORAGE BINS

(71) Applicant: Autostore Technology AS, Nedre Vats (NO)

(72) Inventors: Ingvar Hognaland, Nedre Vats (NO); Ivar Fjeldheim, Haugesund (NO); Trond Austrheim, Etne (NO); Børge Bekken, Haugesund (NO)

(73) Assignee: Autostore Technology AS, Vindafjord (NO)

( * ) Notice: Subject to any disclaimer, the term of this patent is extended or adjusted under 35 U.S.C. 154(b) by 18 days.

(21) Appl. No.: 15/319,103

(22) PCT Filed: Jun. 16, 2015

(86) PCT No.: PCT/EP2015/063415
§ 371 (c)(1),
(2) Date: Dec. 15, 2016

(87) PCT Pub. No.: WO2015/193278
PCT Pub. Date: Dec. 23, 2015

(65) Prior Publication Data
US 2017/0129702 A1    May 11, 2017

(30) Foreign Application Priority Data
Jun. 19, 2014 (NO) .................................... 20140773

(51) Int. Cl.
*B65G 1/04* (2006.01)
*B60S 9/215* (2006.01)

(52) U.S. Cl.
CPC ............ *B65G 1/0464* (2013.01); *B60S 9/215* (2013.01); *B65G 1/0478* (2013.01)

(58) Field of Classification Search
CPC .. B65G 1/0428; B65G 1/0457; B65G 1/0464; B65G 1/0478; B60S 9/215
See application file for complete search history.

(56) References Cited

U.S. PATENT DOCUMENTS

| | | | |
|---|---|---|---|
| 3,800,963 A | 4/1974 | Holland | |
| 4,088,232 A | 5/1978 | Lilly | |

(Continued)

FOREIGN PATENT DOCUMENTS

| | | | | |
|---|---|---|---|---|
| CH | 640797 A5 | * | 1/1984 | ......... B65G 10/0478 |
| CN | 1248954 A | | 3/2000 | |

(Continued)

OTHER PUBLICATIONS

International Search Report issued in PCT/EP2015/063415, dated Sep. 7, 2015 (2 pages).

(Continued)

*Primary Examiner* — James Keenan
(74) *Attorney, Agent, or Firm* — Osha Liang LLP

(57) ABSTRACT

A remotely-operated vehicle assembly for picking up storage bins from a storage system and a method for changing vehicle direction includes a body displaying a cavity, a lifting device connected to the body for lifting the bin into the cavity, a displacement arrangement including a displacement motor which provides power to displace one or both of first and second sets of vehicle wheels between a displaced state where the relevant vehicle wheels are displaced away from the underlying system during use, and a non-displaced state where the relevant vehicle wheels are in contact with the underlying system during use, and driving wheels coupled to the displacement arrangement. The driving wheels include the first and second sets of vehicle wheels connected to the body allowing movement of the vehicle (Continued)

along first and second directions, respectively, within the system. The first and second directions are perpendicular.

21 Claims, 17 Drawing Sheets

(56) References Cited

U.S. PATENT DOCUMENTS

| | | | | |
|---|---|---|---|---|
| 4,470,742 | A * | 9/1984 | Schindler | B65G 1/0478 |
| | | | | 414/286 |
| 4,998,595 | A * | 3/1991 | Yeh | B60S 9/215 |
| | | | | 180/202 |
| 5,190,427 | A * | 3/1993 | Lai | B65G 1/0478 |
| | | | | 414/236 |
| 7,381,022 | B1 * | 6/2008 | King | B65G 1/0492 |
| | | | | 187/270 |
| 9,422,108 | B2 * | 8/2016 | Hognaland | B65G 1/0464 |
| 9,682,822 | B2 * | 6/2017 | Lindbo | B65G 1/137 |
| 10,000,337 | B2 * | 6/2018 | Lindbo | B65G 1/0464 |
| 2005/0191160 | A1 | 9/2005 | Melin et al. | |
| 2016/0194151 | A1 | 7/2016 | Lindbo et al. | |

FOREIGN PATENT DOCUMENTS

| | | | | |
|---|---|---|---|---|
| CN | 104837747 A | | 8/2015 | |
| DE | 19935742 A1 * | 2/2001 | | B65G 1/0464 |
| EP | 2 308 778 A2 | | 4/2011 | |
| FR | 2 730 715 A1 | | 8/1996 | |
| NO | 317366 B1 | | 10/2004 | |
| NO | 20121488 A | | 6/2014 | |
| NO | 335 839 B1 | | 3/2015 | |
| WO | 98/49075 A1 | | 11/1998 | |
| WO | 2005/077789 A1 | | 8/2005 | |
| WO | WO-2007043129 A1 * | 4/2007 | | B65G 1/0478 |
| WO | 2013/167907 A1 | | 11/2013 | |

OTHER PUBLICATIONS

Written Opinion of the International Searching Authority issued in PCT/EP2015/063415, dated Sep. 7, 2015 (5 pages).

Norwegian Search Report issued in NO 20140773 dated Jan. 19, 2015 (2 pages).

Office Action issued in Chinese Application No. 201580033911.7, dated May 14, 2018 (16 pages).

* cited by examiner

ROBOT FOR TRANSPORTING STORAGE BINS

TECHNICAL FIELD

The present invention relates to a remotely operated vehicle assembly for picking up storage bins from a storage system, a storage system for storage of bins and a method for changing direction of the vehicle.

BACKGROUND AND PRIOR ART

A remotely operated vehicle for picking up storage bins from a storage system is known. A detailed description of a relevant prior art storage system is presented in WO 98/49075, and details of a prior art vehicle being suitable for such a storage system is disclosed in Norwegian patent NO317366. Such a prior art storage system comprises a three dimensional storage grid containing storage bins that are stacked on top of each other up to a certain height. The storage grid is normally constructed as aluminium columns interconnected by top rails, and a number of remotely operated vehicles, or robots, are arranged to move laterally on these rails. Each robot is equipped with a lift for picking up, carrying, and placing bins that are stored in the storage grid, and a rechargeable battery in order to supply electrical power to a robot incorporated motor. The robot typically communicates with a control system via a wireless link and is recharged at a charging station when needed, typically at night.

An example of a prior art storage system is illustrated in FIG. 1. The storage system 3 includes a plurality of vehicles or robots 1 configured to move on dedicated supporting rails 13 and to receive a storage bin 2 from a storage column 8 within a bin storing grid 15. The prior art storage system 3 may also include a dedicated bin lift device 50, the latter being arranged to receive a storage bin 2 from the robot 1 at the top level of the storage system 3 and to convey the storage bin 2 down in a vertical direction to a delivery station, or port 60.

However, with this known system each vehicle assembly is covering a cross section of the underlying storage system that corresponds to two storage columns, thereby limiting the maximum number of simultaneously operating vehicles.

One or more embodiments of the present invention provide a vehicle assembly, a storage system and a method for operating such a vehicle assembly that allows a significant increase in the number of simultaneously operating vehicles during successful handling of storage bins.

SUMMARY OF THE INVENTION

One or more embodiments of the present invention is set forth and characterized in the main claims, while the dependent claims describe other characteristics of one or more embodiments of the invention.

In particular, one or more embodiments of the invention concern a remotely operated vehicle assembly being suitable for picking up storage bins from a storage system. The vehicle assembly comprising a vehicle body displaying a cavity being suitable for receiving a storage bin stored within the storage system, a vehicle lifting device being connected at least indirectly to the vehicle body and suitable for lifting the storage bin into the cavity, a displacement arrangement comprising inter alia a displacement motor which is configured to at least provide the power that is necessary in order to displace one or both of the first set of vehicle rolling means and the second set of vehicle rolling means between a displaced state where the relevant vehicle rolling means is displaced away from the underlying storage system during use, and a non-displaced state where the relevant vehicle rolling means is in contact with the underlying storage system during use, and driving means coupled to the displacement arrangement. The driving means further comprises a first set of vehicle rolling means connected to the vehicle body allowing movement of the vehicle along a first direction (X) within the storage system during use and a second set of vehicle rolling means connected to the vehicle body allowing movement of the vehicle along a second direction (Y) in the storage system during use, wherein the second direction (Y) is perpendicular to the first direction (X). The motor providing the necessary power to drive the vehicle assembly in the X or Y direction may be one or more dedicated motors and/or the displacement motor. The vehicle assembly is further characterized in that the displacement motor is situated in a lateral plane above the cavity, and further configured to generate a power that is converted by the remaining components of the displacement arrangement to a vertically directed pressure force acting on the first or second set of vehicle rolling means (10, 11). The lateral plane is hereinafter defined as any planes which are arranged parallel to the plane set up by the first (X) and second (Y) direction. Furthermore, the vertical direction, or Z-direction, is defined as the direction perpendicular to the lateral plane. The delimitation of the cavity may be set by dedicated plates and/or by the surrounding components constituting the displacement arrangement and the driving means.

In an advantageous embodiment the transfer of power or force from the displacement motor to the corresponding vehicle rolling means is performed by means of at least one lever arm configured to allow mechanical alternation between the displaced state and the non-displaced state.

In another advantageous embodiment at least one of the vehicle rolling means comprises a first part and a second part being arranged at opposite facing side walls of the vehicle body and a vertically displaceable bar rigidly interconnecting the first part and the second part above the cavity, or at least at an upper half of the vehicle body. The bar may advantageously be arranged parallel to the before mentioned lateral plane.

In another advantageous embodiment the displacement arrangement comprises at least one lever arm configured to abut the vertically displaceable bar during operation of the displacement motor. Said at least one lever arm may be arranged at least partly below the vertically displaceable bar, at the side or above the cavity. The area where the lever arm abuts the bar is preferably at or near the arms' longitudinal midpoint. The term 'at least partly below' signifies an arrangement of the level arm that results in an abutment point positioned below the bar relative to any underlying storage system. The at least one lever arm may advantageously be arranged at an upper half of the vehicle body. Furthermore, they may be arranged either above or along the sides of the cavity, or both.

In another advantageous embodiment the two ends of each lever arm are arranged on each lateral side of an impact area of the lever arm from which the vertically directed pressure force on the vehicle rolling means forms during the operation of the displacement motor, and thereby achieving controlled displacement of the vehicle rolling means.

In another advantageous embodiment a first end of each lever arm is connected to a first rotatable device within an upper part of the vehicle body, for example a rotatable bolt, thus defining a lever arm fulcrum, and a second end of each lever arm is at least indirectly connected to the displacement motor allowing the rotation of the lever arm around its fulcrum at the first end. This rotation causes the desired vertical displacement of the vehicle rolling means.

In another advantageous embodiment the displacement arrangement further comprises at least one locking means, for example an elongated hook, where each locking means is pivotally connected to its corresponding lever arm at or near the second end and a second rotatable device situated at the upper half of the vehicle body, wherein the locking means and the second rotatable device are interconnected to allow releasable blocking after a predetermined angular rotation performed by the displacement motor.

In another advantageous embodiment at least one of the locking means is connected to a rotor of the displacement motor which enforces a rotating movement of the connected locking means, thereby causing the desired vertical displacement of the at least one of the first set of vehicle rolling means and the second set of vehicle rolling means relative to any underlying storage system.

In another advantageous embodiment the vehicle assembly further comprises at least one driving motor situated at the lateral plane above the cavity, the driving motor being arranged to drive at least one of the first set of vehicle rolling means and the second set of vehicle rolling means along the lateral plane of any underlying storage system set up by the first (X) and second (Y) directions. The change of direction of the vehicle assembly is preferably discrete. i.e. constituting a 90 degrees turn.

In another advantageous embodiment at least one of the vehicle rolling means comprises a first part and a second part that are arranged at opposite facing side walls of the vehicle body and a vertically displaceable bar rigidly interconnecting the first part and the second part at a lateral plane above the cavity, wherein at least one of the first and second part further comprises an upper rotating unit and a lower rotating unit, the upper and lower rotating units being interconnected by a rendering simultaneous rotation of the units possible. At least one of the upper and lower rotating units may be wheels, belts, etc. Furthermore, the cord may comprise any elongated object that allows said simultaneous rotation. The lower rotating unit is configured to at least indirectly contact the underlying storage system during use. The lower rotating unit may advantageously comprise two laterally spaced apart wheels configured to cause releasable contact with the underlying storage system during use, i.e. when the vehicle assembly is set in a non-displaced state.

In one embodiment the interconnecting cord is encircling both the lower and upper rotating unit.

In an alternative embodiment the interconnecting cord is encircling the upper rotating unit but arranged outside the lower rotation unit. The latter configuration may be achieved by means of additional wheels around which the cord is encircling. The assembly of the cord and the additional wheels should then be configured to create a stable pressure onto the lower ration unit, for example by use of two smaller wheels arranged adjacent to each wheels of the lower rotating unit, and where the cord is guided between the larger wheels and the additional wheels. This embodiment is considered more advantageous since it ensures a better contact between the lower rotation unit and the underlying storage system during use.

In another advantageous embodiment at least one of the vehicle rolling means comprises a first part and a second part being arranged at opposite facing side walls of the vehicle body, where the first and second part is rigidly connected to a first and second displacement plate, respectively, and a vertically displaceable bar at a lateral plane above the cavity rigidly connecting the first and second displacement plate.

In another advantageous embodiment all components contributing to the vertical displacement of the vehicle rolling means and the operation of the lifting device are arranged above the cavity, and all components contributing to the lateral movement of the vehicle assembly are either arranged above the cavity or within the volume limited by the spatial distribution of the parts of the vehicle rolling means contacting an underlying storage system during operation or a combination thereof.

One or more embodiments of the invention also concern a storage system suitable for storage of bins. The storage system comprises a remotely operated vehicle assembly in accordance with any of the configurations described above, a vehicle support comprising a plurality of crossing supporting rails and a bin storing structure supporting the vehicle support. The structure comprises a plurality of storage columns, wherein each storage columns is arranged to accommodate a vertical stack of storage bins.

In an advantageous embodiment the plurality of crossing supporting rails are of type double track rails comprising a first and second X-rail in the first direction (X) and a third and fourth Y-rail in the second direction (Y).

In another advantageous embodiment the lateral cross sectional area of the remotely operated vehicle assembly occupies at most the lateral cross sectional area of the storage column within the bin storing structure, where the lateral cross sectional area of the storage column corresponds to the lateral area limited by the distance from one supporting rail to the closest parallel supporting rail in each direction, the distance being measured from the centre line of each rails.

One or more embodiments of the invention also concern a method which is suitable for changing direction of a remotely operated vehicle assembly when operated on a storage system. The vehicle assembly comprises a vehicle body displaying a cavity for receiving a storage bin within the storage system, a vehicle lifting device connected at least indirectly to the vehicle body being suitable for lifting the storage bin into the cavity, a displacement arrangement comprising a displacement motor and driving means comprising a first set of vehicle rolling means connected to the vehicle body allowing movement of the vehicle along a first direction (X) within the storage system during use and a second set of vehicle rolling means connected to the vehicle body allowing movement of the vehicle along a second direction (Y) in the storage system during use, the second direction (Y) being perpendicular to the first direction (X). The method is characterized by the following step:

rotate at least one lever arm by operating the displacement motor, where the displacement motor is situated near the upper lateral plane, or above, the cavity and vertically displacing one of the first set of vehicle rolling means and the second set of vehicle rolling means by exerting a pressure force on the vehicle rolling means in the vertical direction, away from any underlying storage system, by means of the rotating lever arm.

In an advantageous embodiment the remotely operated vehicle assembly used in the disclosed method is a vehicle in accordance with any of the configurations mentioned above.

In the following description, numerous specific details are introduced to provide a thorough understanding of embodiments of the claimed vehicle, system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

DETAILED DESCRIPTION OF THE INVENTION

Hereinafter all relative terms used to describe the inventive robot such as upper, lower, lateral, vertical, X-direction, Y-direction, Z-direction, etc, shall be interpreted using the above mentioned prior art storage system as reference system. Note also that a robot is herein considered to be a particular type of a remotely operated vehicle.

Figure 1:
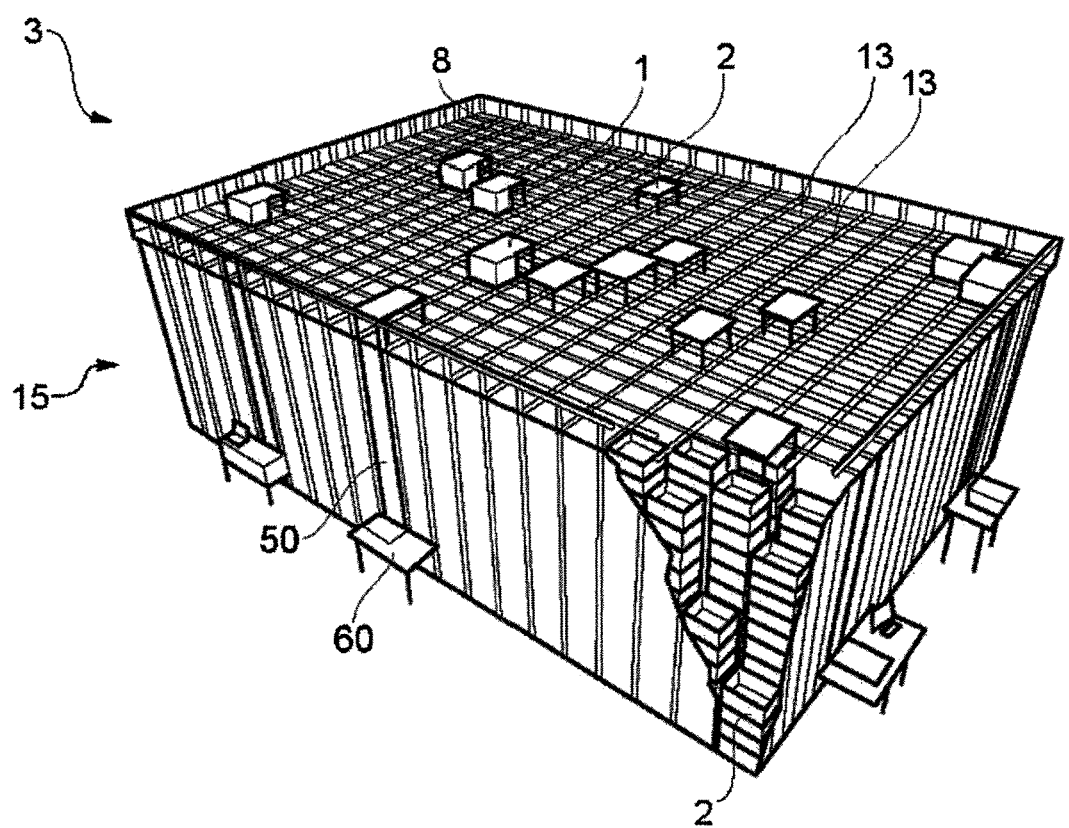
FIG. 1 is a perspective view of a prior art storage system.
Figure 2:
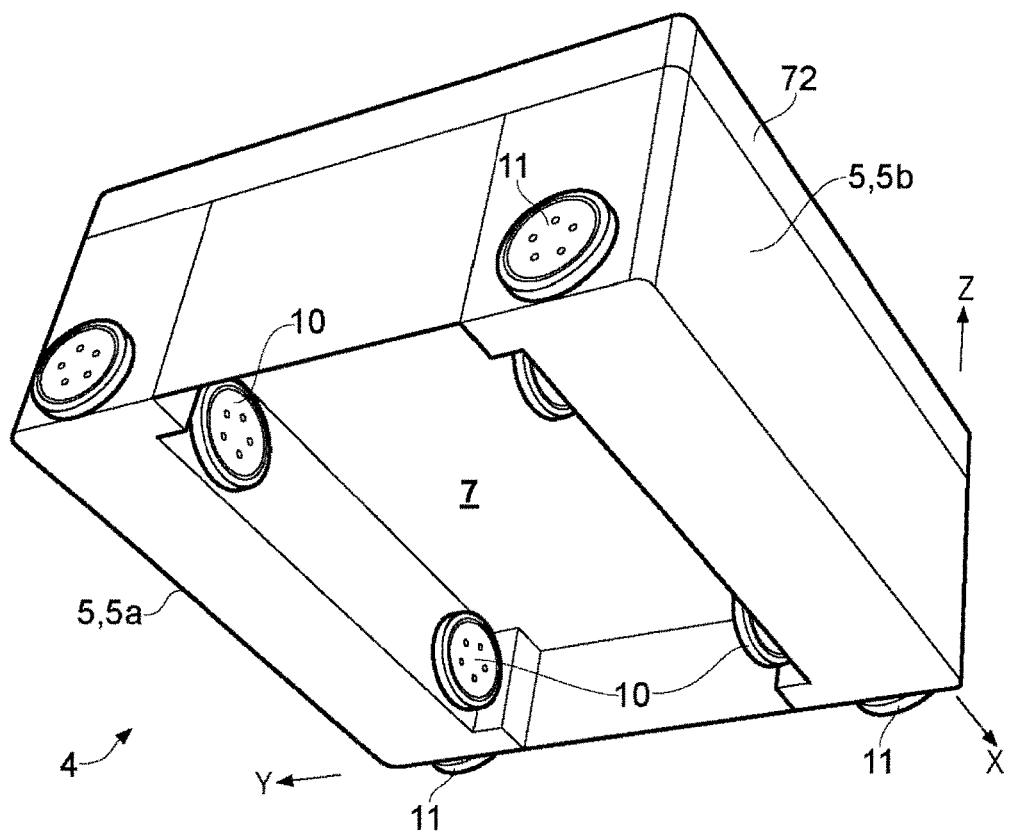
FIG. 2 is a perspective view of a remotely operated vehicle according to a first embodiment of the invention.
Figure 3:
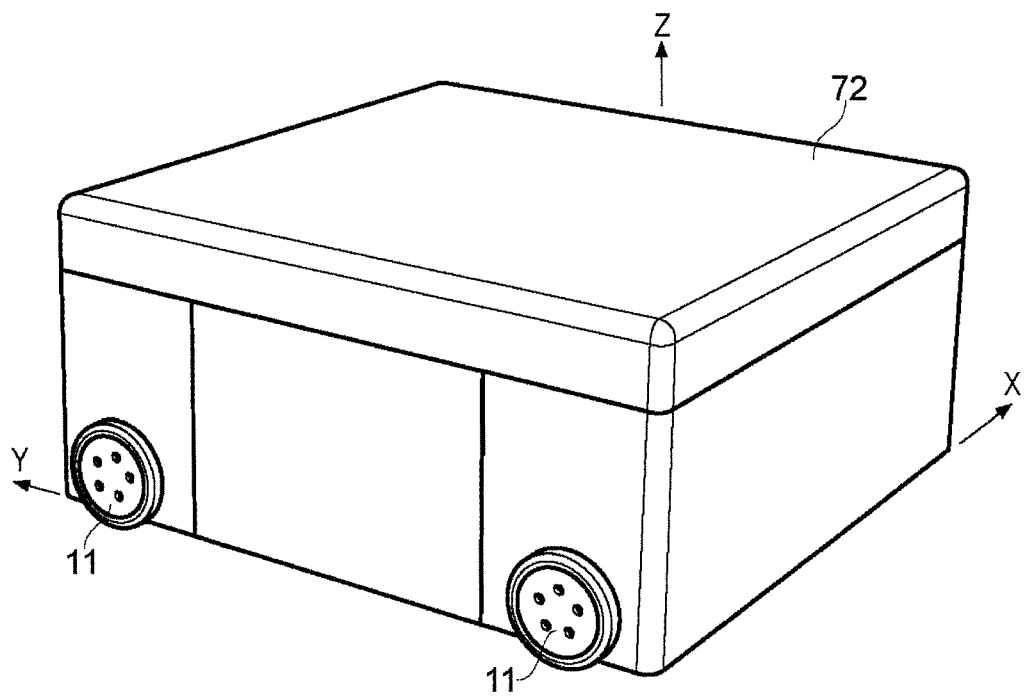
FIG. 3 is a perspective view of the remotely operated vehicle of FIG. 2 observed from a different angle.
Figure 4:
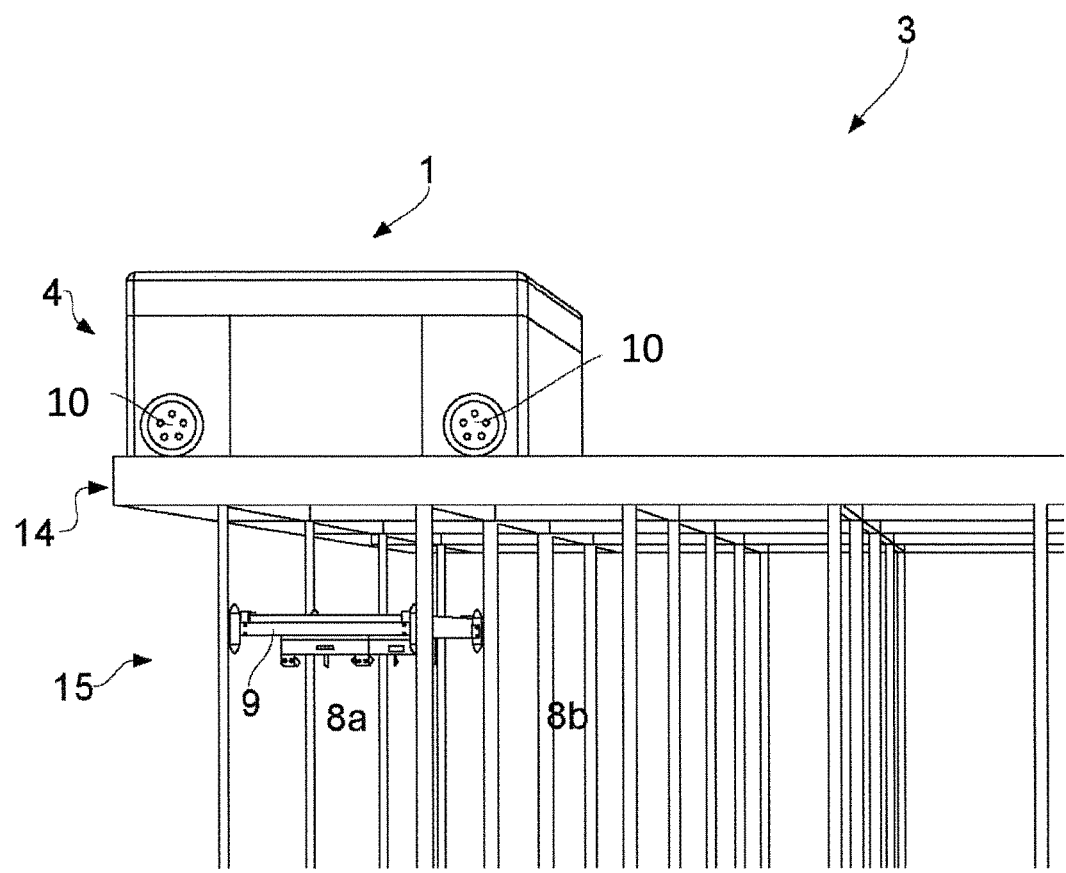
FIG. 4 is a perspective view of part of a storage system in accordance with a first embodiment of the invention including a bin storing grid, a vehicle support and a remotely operated vehicle.

FIGS. 2 and 3 give perspective views in two different angles of a robot 1 in accordance with a first embodiment of the invention comprising a rectangular vehicle body or framework 4 displaying a cavity 7 centrally arranged there within, a top cover 72 covering the top part of the body 4, a first set of four wheels 10 mounted inside the cavity 7 and a second set of four wheels 11 mounted at the exterior walls of the body 4. The first and second set of wheels 10,11 are oriented perpendicular to each other. For the sake of clarity a Cartesian coordinate system is shown with its X, Y and Z axes aligned along the principal directions of the rectangular vehicle body 4. The size of the cavity 7 is adapted to at least contain the largest storage bin 2 intended to be picked up by the robot 1, and preferably also a vehicle lifting device 9 (FIG. 4). The lateral area, i.e. along the X and Y directions, may be of any size relative to the prior art storage system, for example less than the lateral area of an underlying storage column 8a, exactly matching the lateral area of the underlying storage column (see additional embodiment below) and extending beyond the lateral area of the underlying storage column 8a, either in one direction only (Y direction in FIG. 4) or in both directions.

FIG. 4 shows a part of a storage system 3 where the robot 1 is in a lifting position on a vehicle support 14, directly above a storage column 8,8a within a supporting bin storing structure 15. A vehicle lifting device 9 is lowered a distance into the storage column 8,8a in order to hook onto, and lift up, any storage bin 2 within the column 8. The reference numerals 8a and 8b refer to a central storage columns 8a situated directly below the robot 1 and to an adjacent storage column 8b situated adjacent to the central storage column 8a.

Figure 5:
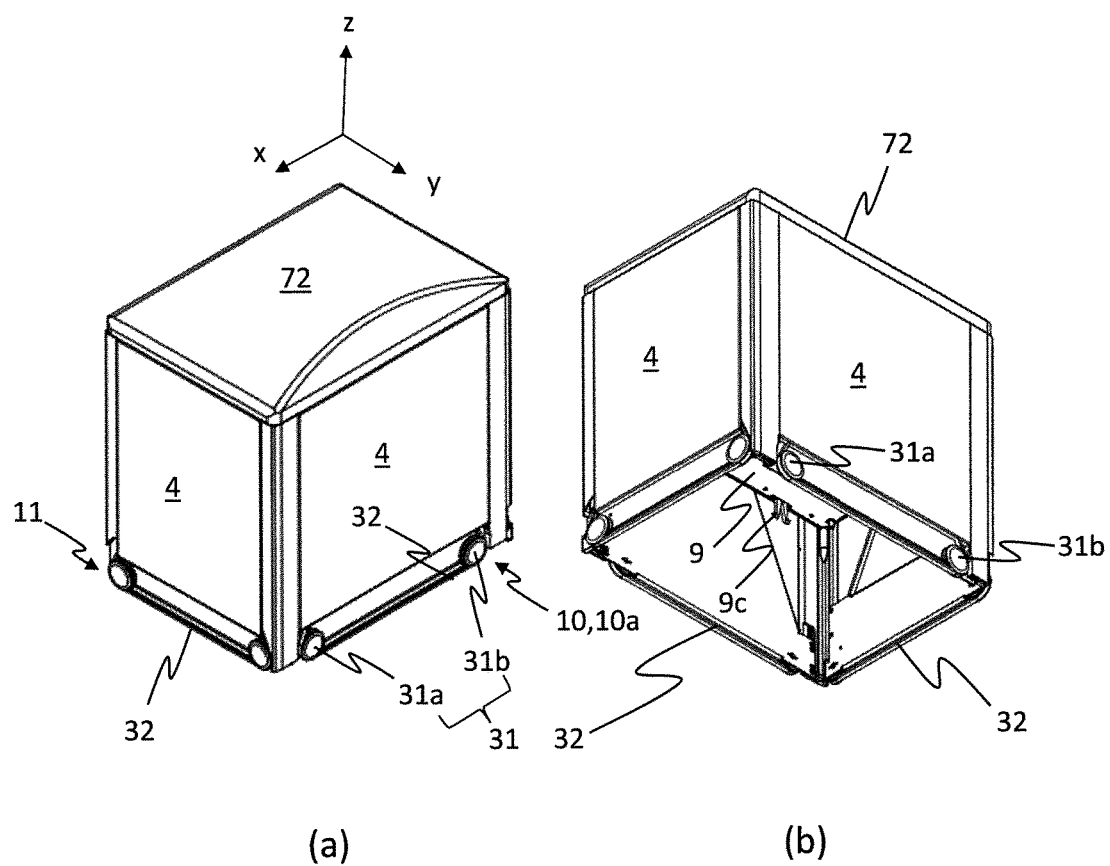
FIGS. 5 (a) and (b) are perspective views observed from two different angles of a remotely operated vehicle according to a second embodiment of the invention.
Figure 6:
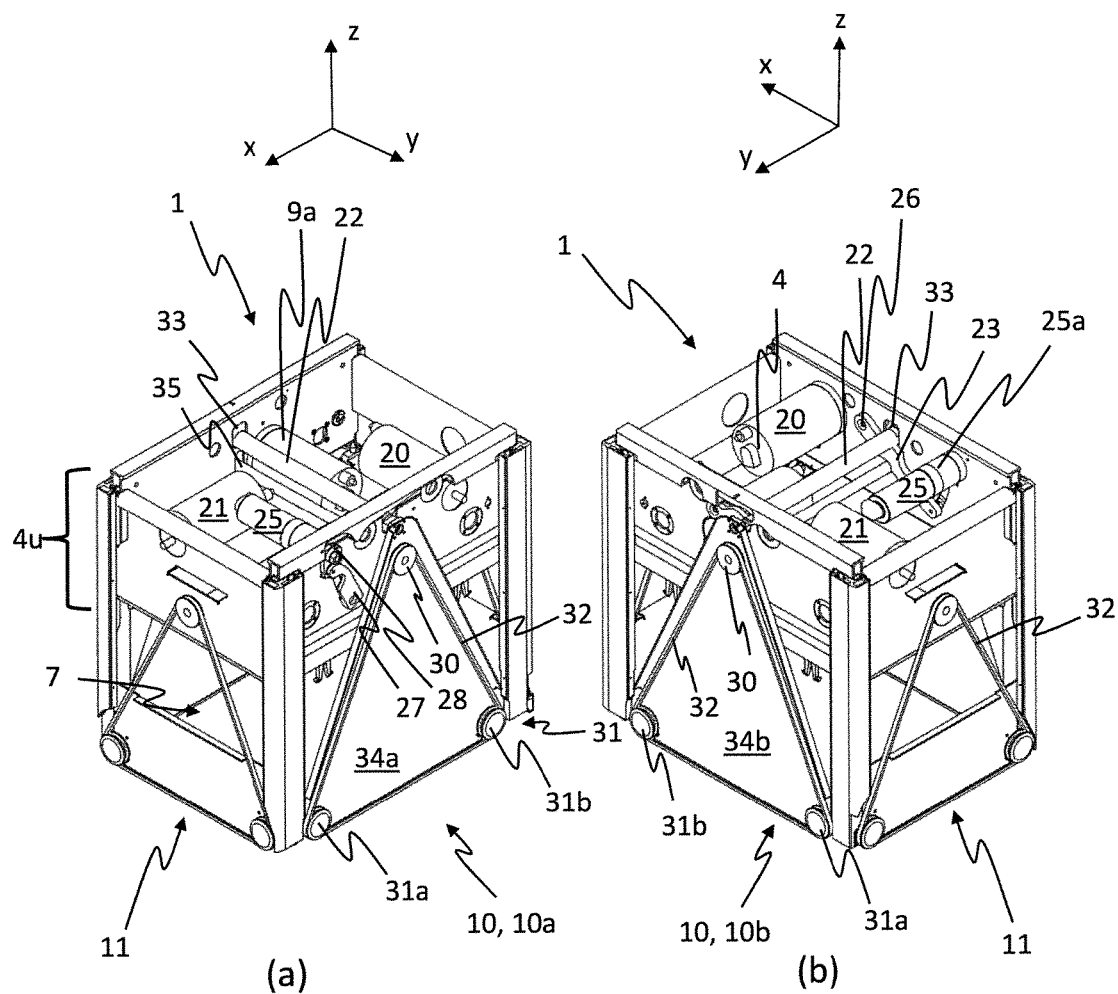
FIGS. 6 (a) and (b) are perspective views observed from two different angles of the remotely operated vehicle of FIG. 5, where exterior side walls and top lid have been removed.

FIGS. 5 and 6 (a) and (b) show the inventive robot 1 in accordance with a second embodiment of the invention. In FIG. 6 the side walls and the top cover 72 have been removed in order to better illustrate all relevant components, in particular related to the wheel displacement arrangement 23-28 and the driving means 10,11. A Cartesian coordination system (X,Y,Z) has been added for the sake of clarity. As in the first embodiment shown in FIGS. 2 and 3 the driving means 10,11 comprises a first set of vehicle rolling means 10 and a second set of vehicle rolling means 11 configured to move the robot 1 along the top of a storage system 3 in the X and Y direction, respectively. Each set 10,11 are composed of two wheel parts 10a,10b arranged along opposite facing side walls of the framework 4, where at least one set 10,11 may be displaced vertically.

As seen in FIG. 6, the wheel parts 10a,10b further comprises a master wheel 30 arranged at an upper part 4u of the framework 4 and slave wheels 31 comprising two slave wheels 31a,31b arranged at, or near, each of the two corners of the lower edge of the framework 4. The slave wheels 31a,31b constitute the conventional driving wheels contacting, directly or indirectly, the underlying storage system 3 during use. The three wheels 30,31a,31b of each four wheel parts are interconnected by an at least partly encircling belt or cord 32, ensuring a simultaneous rotation of each slave wheels 31a,31b when the master wheel 30 is set in operation by one or more drive units 20,21.

In order to lift the slave wheels 31,31a,31b from the storage system 3 during change of direction of the robot 1, one or more vertically displaceable bars 22 is/are mounted above the cavity 7 interconnecting a first and second displacement plate 34a,34b positioned along opposing side walls of the framework 4, i.e. along the y direction. Each displacement plate 34a,34b rigidly connects the master wheel 30, the slave wheels 31 and the belt 32 in the x-z plane, where the master wheel 30, the slave wheels 31 and the belt constitute the first part of the vehicle rolling means 10a. With this particular configuration any displacement of the bar 22 thus result in a rigid displacement of the connected driving means 10. FIG. 6 shows a configuration where only the first set of vehicle rolling means 10 is displaceable by the bar 22. However, it is clear for the skilled person that alternative configurations are possible where the second set of vehicle rolling means 11 may be displaced instead of, or in addition to, the first set of vehicle rolling means 10, without deviating from the main purpose of the invention.

Figure 7:
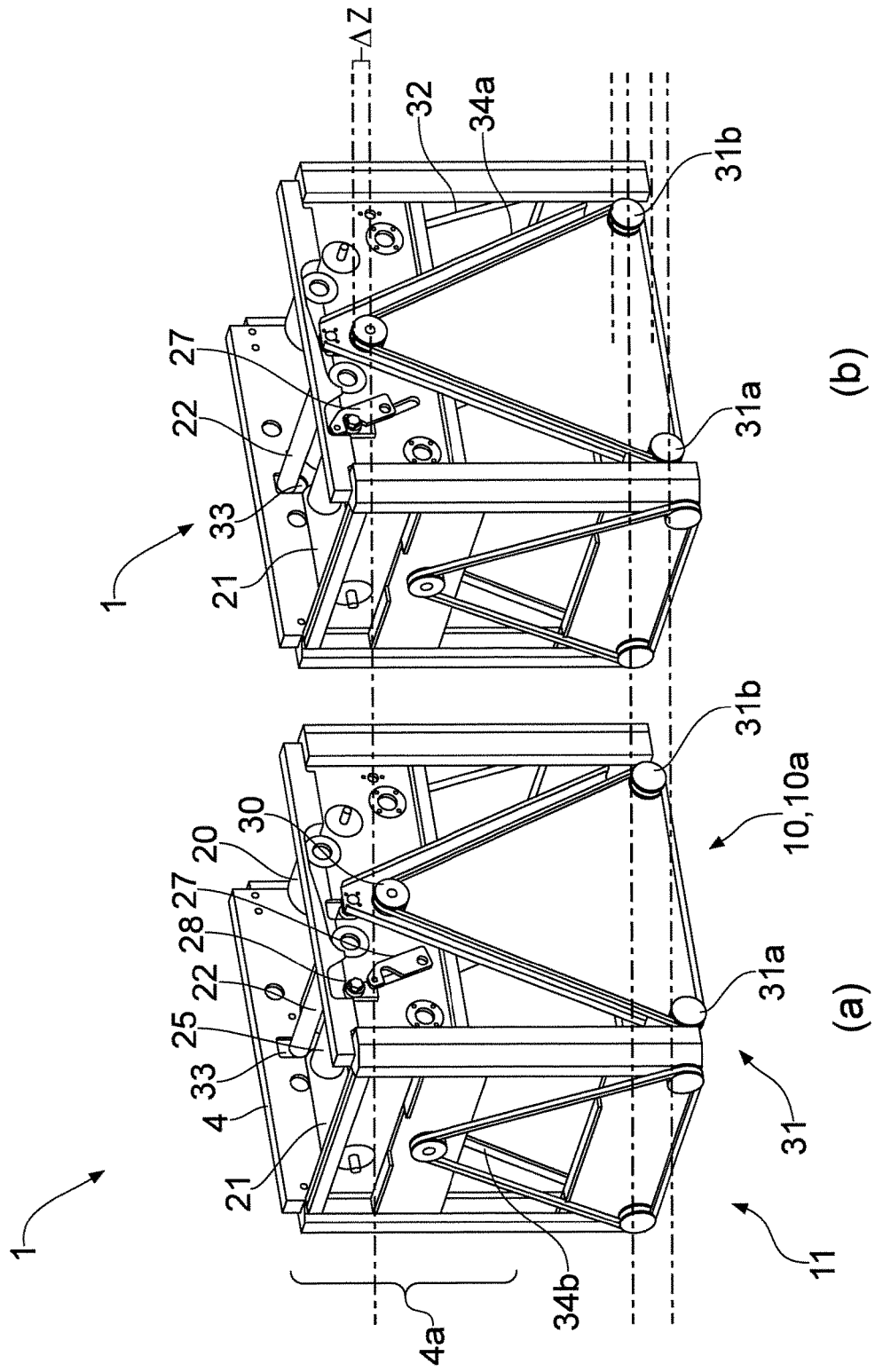
FIGS. 7 (a) and (b) are perspective views of a remotely operated vehicle according to FIGS. 5-6, where one of the set of wheels are in its operational (lower) position and in its non-operational (elevated) position, respectively.

The displacement of the bar 22 may be achieved by means of a lever arm 23 configured to exert an upward directed pressure force activated by a displacement motor 25,25a, thereby pushing the bar 22 vertically. To ensure high predictability during displacement, the bar 22 can be arranged and guided within suitable slots 33 having a width being slightly larger than the diameter of the bar 22 and a length being equal or slightly longer than the total displacement length ($\Delta z$) (FIG. 7). The end of the lever arm 23 is mounted on a rotatable bolt 26 situated at one lateral side of the bar 22, thus defining a fulcrum 26. The lateral distance between the fulcrum 26 and the bar 22 may for example be half the length of the lever arm 23.

Figure 8:
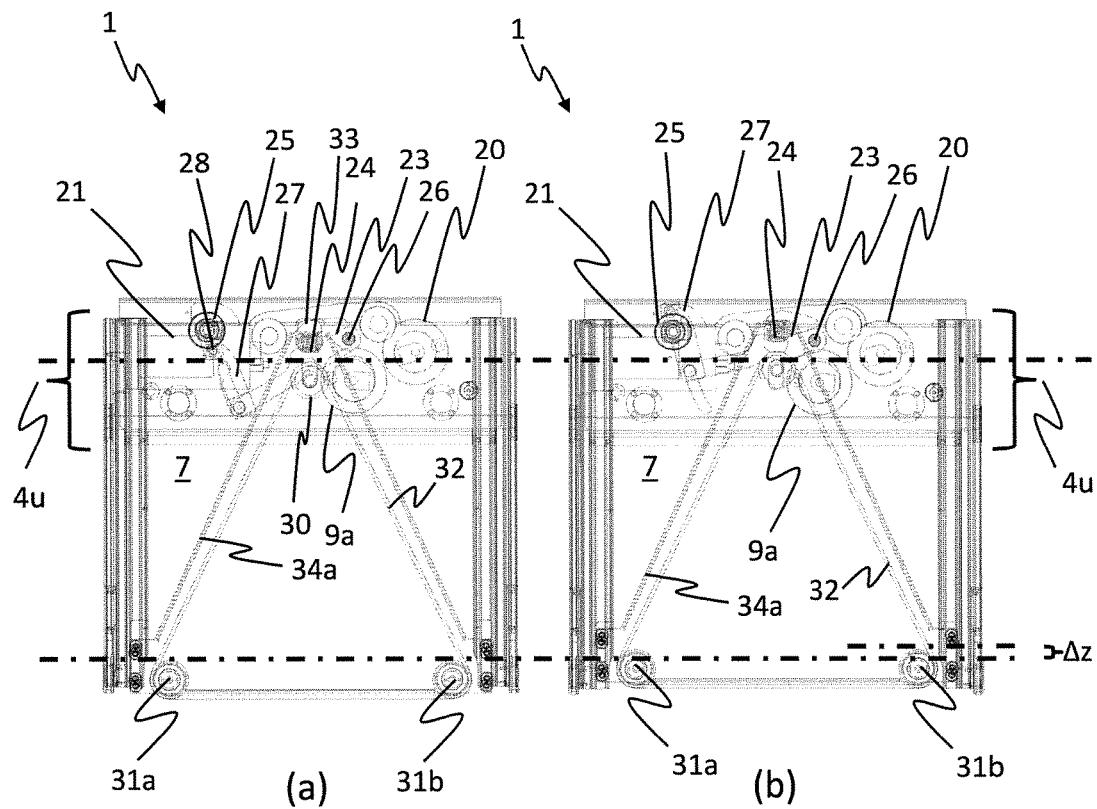
FIGS. 8 (a) and (b) are cross-sectional, transparent views of the remotely operated vehicle according to FIGS. 5-7 where one of the set of wheels is in its operational position and in its non-operation position, respectively.

The rotational mechanism of the lever arm 23 may be situated at the opposite lateral side of the bar 22 relative to the fulcrum 26. This particular embodiment is illustrated in FIGS. 5-8. With reference to FIGS. 6 and 7 the rotational mechanism comprises a displacement motor 25 (for example a DC motor) having a rotor 25a, a lever arm wheel 28 attached to the rotor 25a, a locking arm 27 attachable in one end to the lever arm wheel 28 and attached in the other end to the end of the lever arm 23 opposite to the fulcrum 26. The locking arm 27 is configured to at least partly enclose the lever arm wheel 28 when the lever arm 23 is rotated into its upper position, i.e. the position where the bar 22 has been pushed up to its uppermost position; thereby blocking any vertical movements of the lever arm 23 that is not caused by controlled operation of the displacement motor 25. FIGS. 7(b) and 8(b) show the situation where the locking arm 27 is in its upper position.

The rotation of the lever arm 23 may alternatively be operated by a displacement motor arranged at its fulcrum 26.

In yet an alternative configuration the rotation of the lever arm 23 may be operated by arranging a suitable displacement motor both at its fulcrum 26 and at or near the opposite end of the lever arm 23.

FIGS. 7, 8 (a) and FIGS. 7, 8 (b) illustrate the robot 1 with its master and slave wheels 30,31 in their non-displaced and displaced state, respectively. In the figures, $\Delta z$ signifies the displacement length of the driving means 10 after a successful wheel displacement. The dotted lines are added in order to better indicate the actual wheel positions, where the upper line pair in FIG. 7 shows the change in position of the master wheel 30, and the two lower line pairs in FIG. 7 show the corresponding change in position of the two slave wheels 31.

Figure 9:
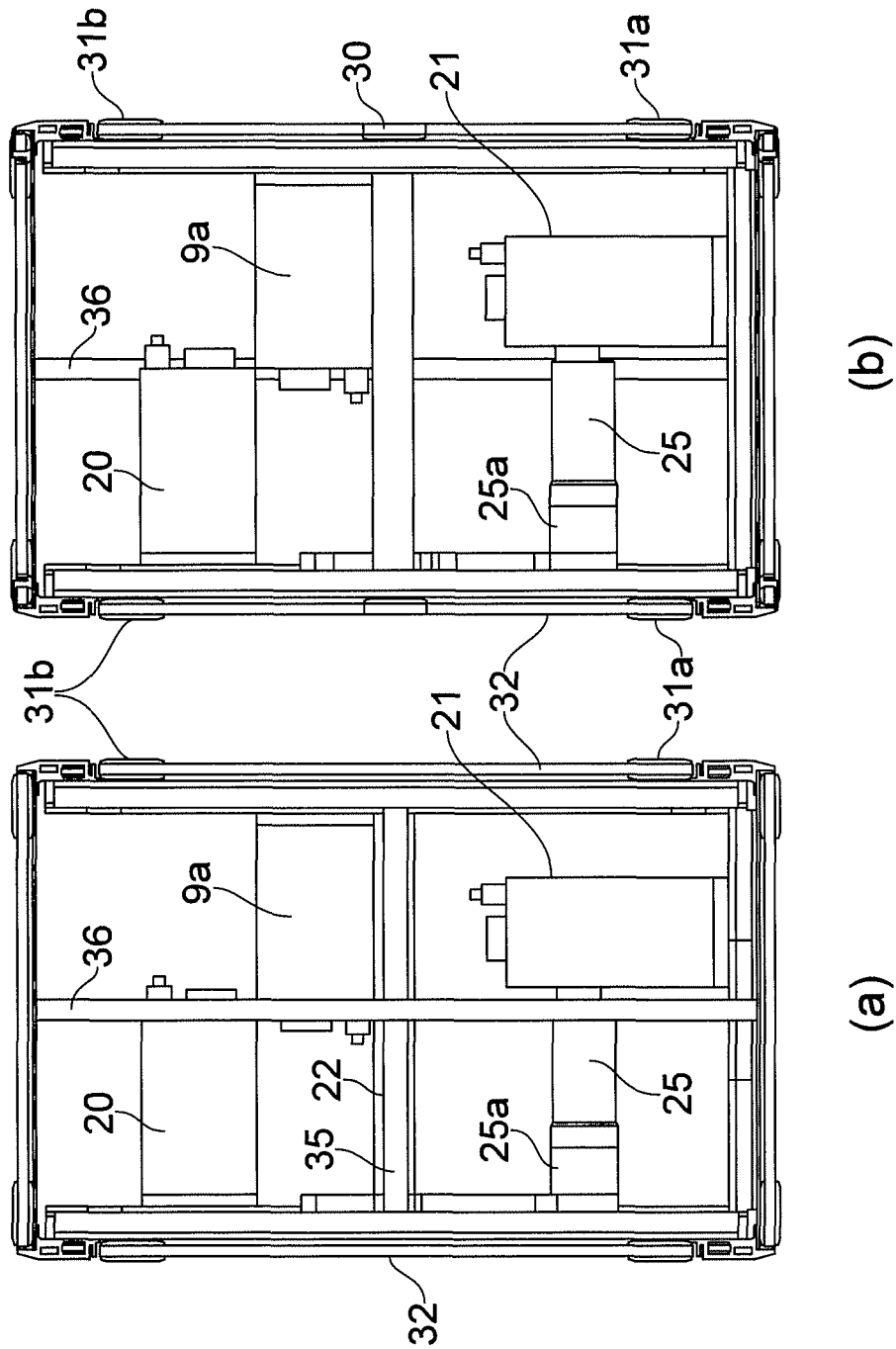
FIGS. 9 (a) and (b) are views of the remotely operated vehicle according to FIGS. 5-8 seen from below and above, respectively.

FIGS. 9 (a) and (b) shows the stripped robot 1 from below and above, respectively. The before mentioned displacement motor 25 with its rotor 25a is shown at the lower left side. The driving motors 20,21 for driving the robot in the X and Y directions are shown at the upper left side and lower right side, respectively, and the vehicle lifting device motor 9a is shown at the upper right side. At least one of the motors 9a,20,21 is preferably a DC motor. Each driving motor 20,21 is operating a drive shaft 35,36, which again is connected at their ends to the opposite facing master wheels 30, thereby providing transmission of rotational force to the slave wheels 31 via belts 32.

Figure 10:
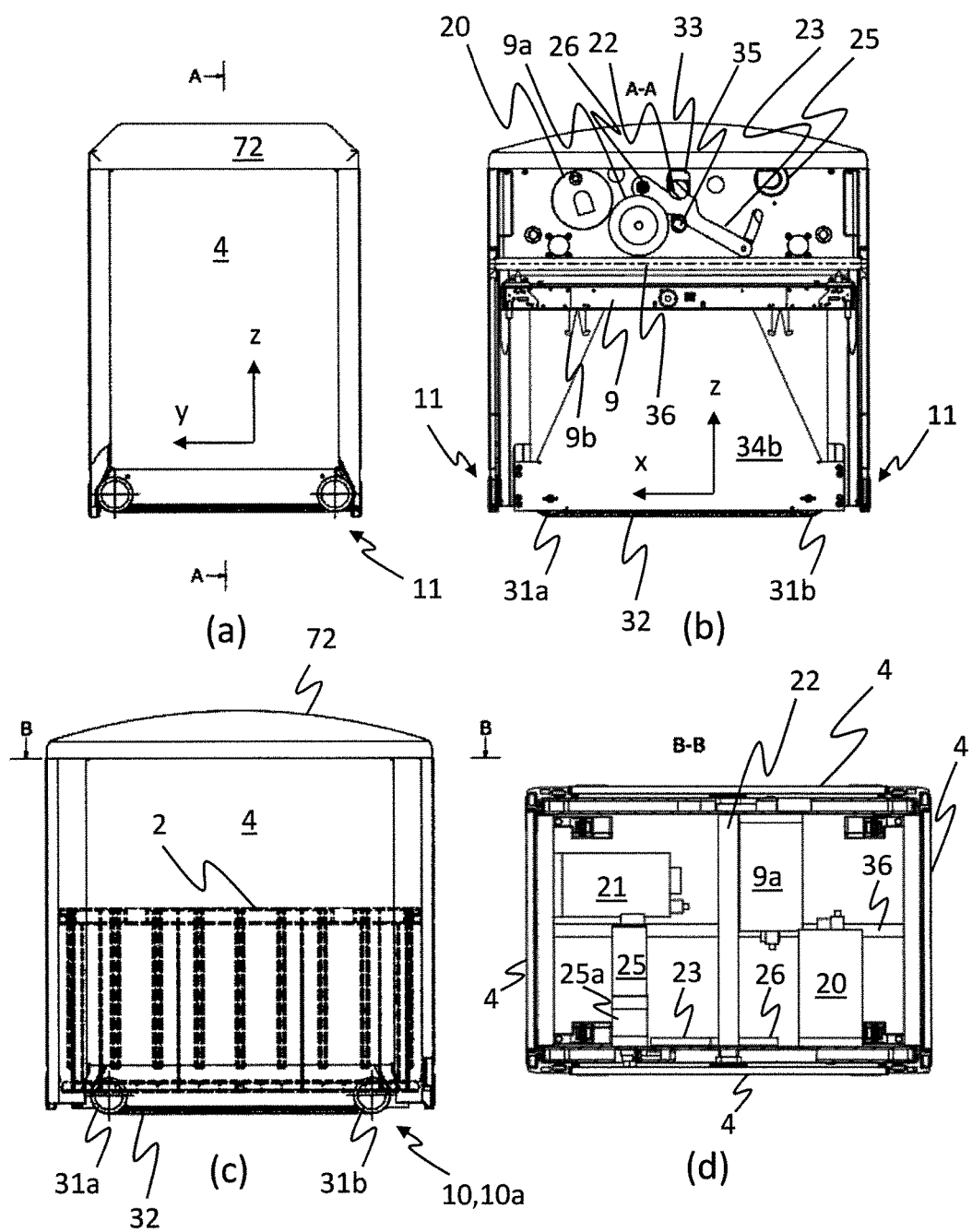
FIGS. 10 (a) to (d) are side views of the remotely operated vehicle according to FIGS. 5-9, where FIG. 10 (a) shows the vehicle seen along x direction with casing, FIG. 10 (b) shows a cross section of the vehicle along the section A-A of FIG. 10 (a), FIG. 10 (c) shows a partly transparent side view of the vehicle along the y direction and FIG. 10 (d) shows a cross section of the vehicle along the section B-B of FIG. 10 (c)
Figure 11:
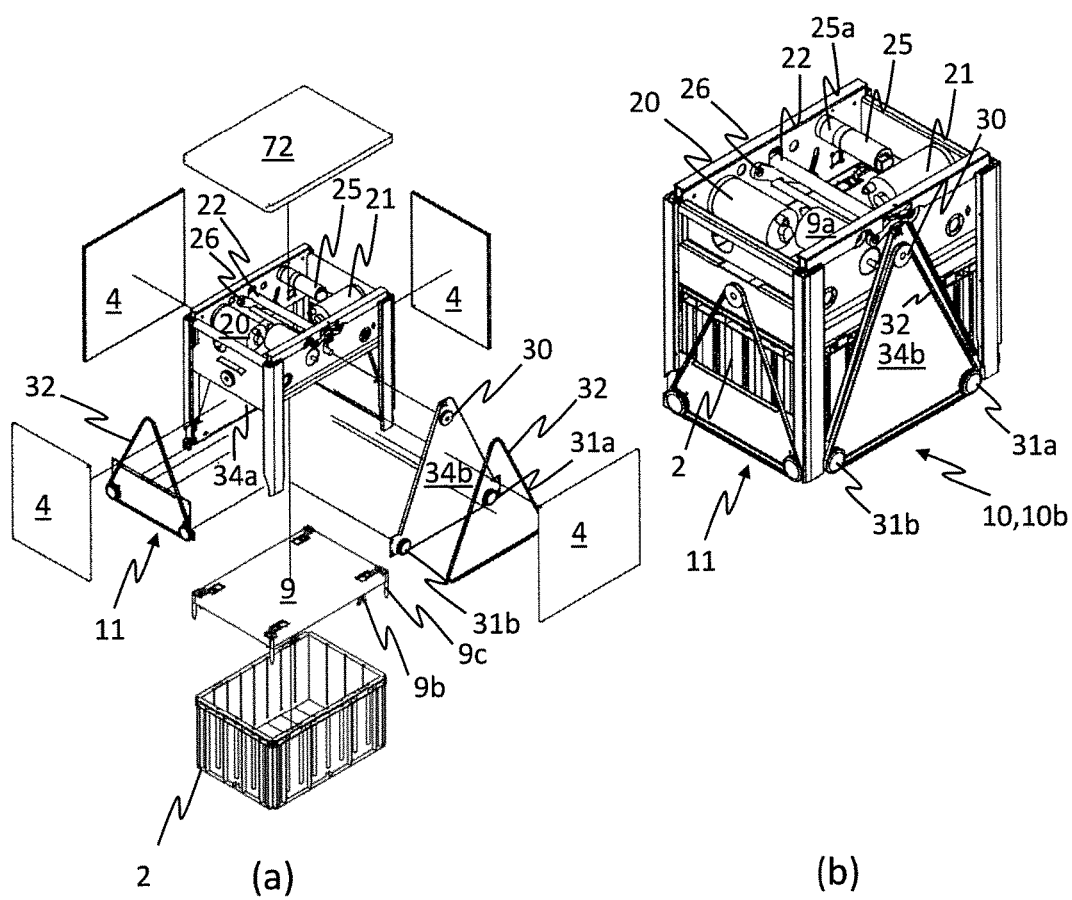
FIGS. 11 (a) and (b) are perspective views of the remotely operated vehicle according to FIGS. 5-10 showing the vehicle in an exploded and non-exploded view drawing, respectively.

FIGS. 10-11 show other illustrations of the vehicle in accordance with the second embodiment.

A vehicle with a top cover 72 (non-removable or removable) and a vehicle body 4 covering all sides in the X,Y directions is shown in FIGS. 10 (a) and (b) observed along x direction and y direction respectively.

In the partly transparent illustration in FIG. 10 (c) a storage bin 2 may be seen arranged fully within the cavity 7. FIGS. 10 (b) and (d) show a cross sectional views along section A-A of FIG. 10 (a) and section B-B of FIG. 10 (c), revealing internal components of the vehicle 1. With reference to FIG. 10 (b), the second displacement plate 34b is shown extending from the upper part 4u of the vehicle body/framework 4, including the master wheel 30, and to the lower edge of the vehicle 1, including the slave wheels 31,31a,31b (FIG. 11).

Figure 15:
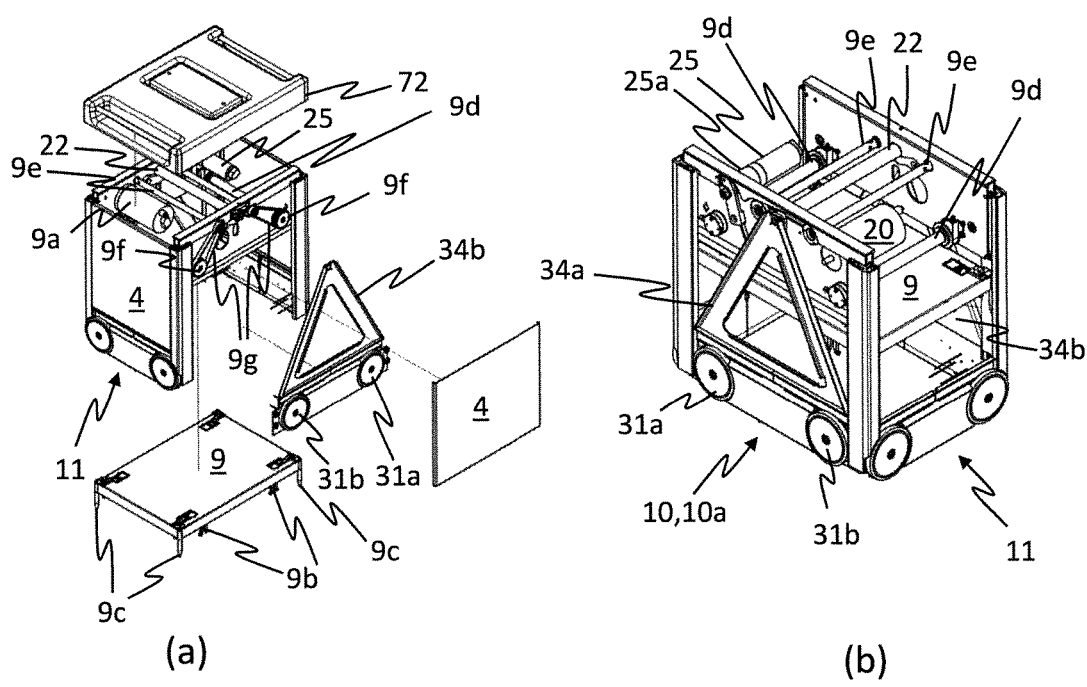
FIGS. 15 (a) and (b) are perspective views of the remotely operated vehicle according to FIGS. 13 and 14 showing the vehicle in an exploded and non-exploded view drawing, respectively, FIGS. 16 (a)-(e) show drawings of a remotely operated vehicle according to FIGS. 13-15 arranged on top of a storage system, where FIGS. 16 (a) and (b) are side views seen along the y direction and the x direction, respectively, FIG. 16 (c) is a top view showing the vehicle positioned directly above a storage column and FIGS. 16 (d) and (e) show in further details a double rail configuration.

The vehicle lifting device 9 includes the vehicle lifting device motor 9a, the lifting grips 9b situated below the lifting device plate for grabbing the underlying bin 2, the guiding pins 9c for adjusting the lifting device 9 in correct lateral position during pick-up of the bin 2, a plurality of first lifting device bars 9d (FIG. 15 (b)) establishing a suspended connection from the upper part 4u of the framework 4 to the lateral extending plate of the lifting device 9, one or more second lifting device bars 9e (FIG. 15 (b)) in rotational connection with both the vehicle lifting device motor, a lifting device sheave 9f (FIG. 15 (a)) attached to one or both ends of each first lifting device bars 9d and a lifting device belt 9g (FIG. 15 (b)) enabling rotational connection between the first and second lifting device bars 9d,9e.

FIG. 10 (b) further shows the drive shafts 35,36 drivingly connected to the driving motor 20 (for rotation of one or both of the master wheel 30 in the X direction) and driving motor 21 (for rotation of one or both of the master wheel 30 in the Y direction). As mentioned previously, the rotation of the master wheels 30 causes a corresponding rotation of the corresponding slave wheels 10,31,11. The lever arm 23 is shown in the lowered position, i.e. where the first set of vehicle rolling means 10 is contacting the underlying rails 13. FIG. 10 (d) shows the lateral positions of the driving motors 20,21, the displacement motor 25 with rotor 25a rotating the lever arm 23 around its fulcrum 26 and the vehicle lifting device motor 9a providing necessary power for lifting/lowering of the vehicle device 9.

The exploded and non-exploded drawings shown in FIGS. 11 (a) and 11 (b), respectively, show, in addition to the components disclosed in FIG. 10, the position of the master wheels 30, the slave wheels 31 and the enclosing belt 32, both in the X direction and the Y direction.

Figure 12:
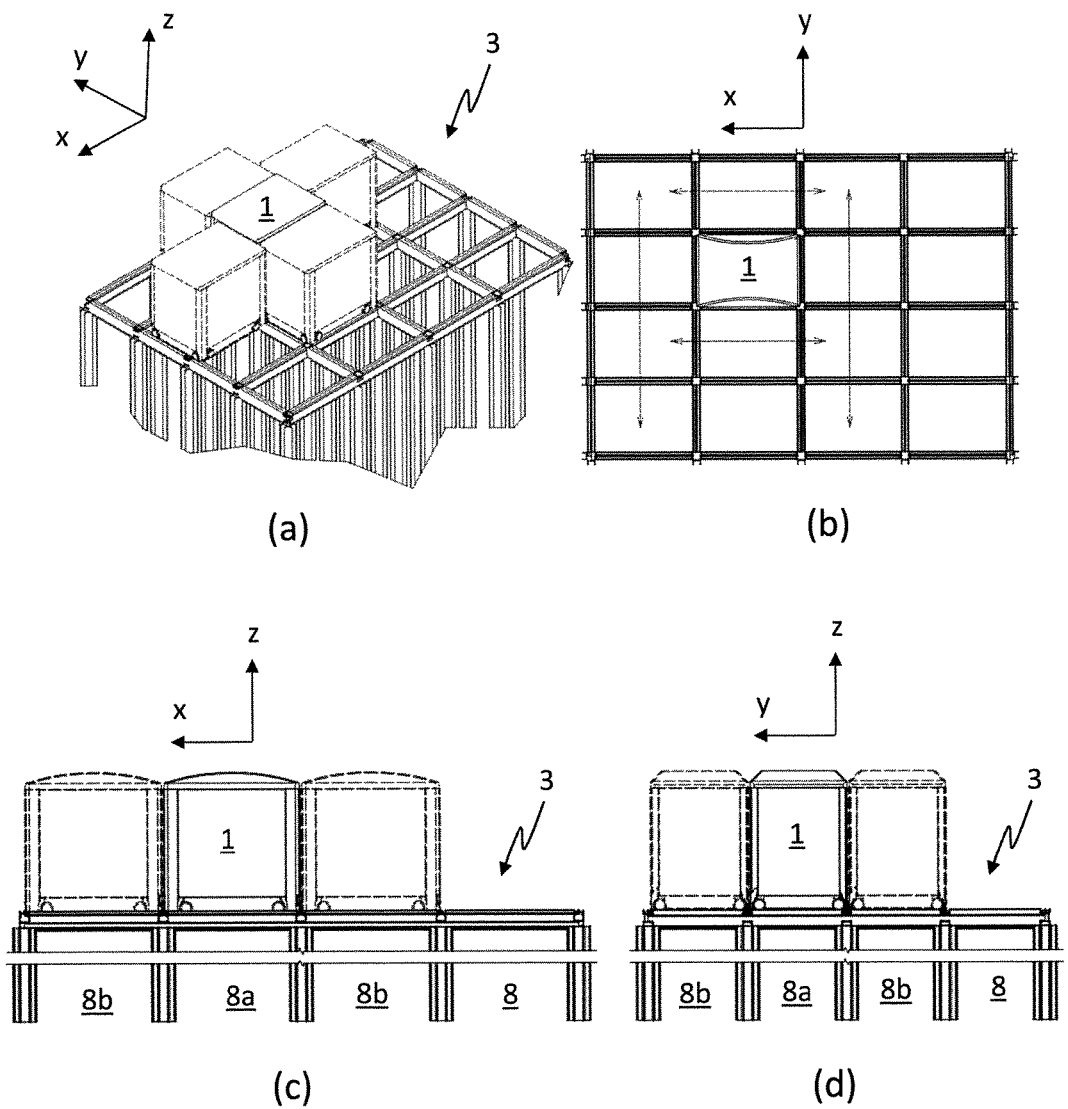
FIGS. 12 (a)-(d) are views of a remotely operated vehicle according to FIGS. 5-11 arranged on top of a storage system, where FIGS. 12 (a) and (b) is a perspective view and a top view, respectively, showing the vehicle in five adjacent positions above a storage columns and FIGS. 12 (c) and (d) are corresponding side views of FIGS. 12 (a) and (b)

The inventive remotely operated vehicle 1 is in FIG. 12 (a)-(d) shown arranged on double track rails 13 constituting part of vehicle support 14 mentioned above. In FIGS. 12 (a), (c) and (d) the vehicle 1 is shown positioned directly above five different columns 8a,8b. Vehicles 1 illustrated with stippled lines indicate possible vehicle positions above columns 8b adjacent to the initial column 8a. As is clearly seen in FIG. 12 the lateral cross sectional area of the inventive vehicle 1 occupies exactly the lateral cross sectional area of one underlying column 8,8a,8b, i.e. within the mid part of the double track rails 13 both in X and Y direction. The lateral cross sectional area of the vehicle 1 may of course be smaller or larger than the lateral cross sectional area of the column 8. However, vehicles 1 with a cross sectional area covering a single cell in the storage system 3, combined with use of double track rails 13,13a-d (see FIG. 16 (d)), has the advantageous that is allows vehicles 1 to pass/cross at all four lateral sides while at the same time maintaining a high degree of stability.

Figure 13:
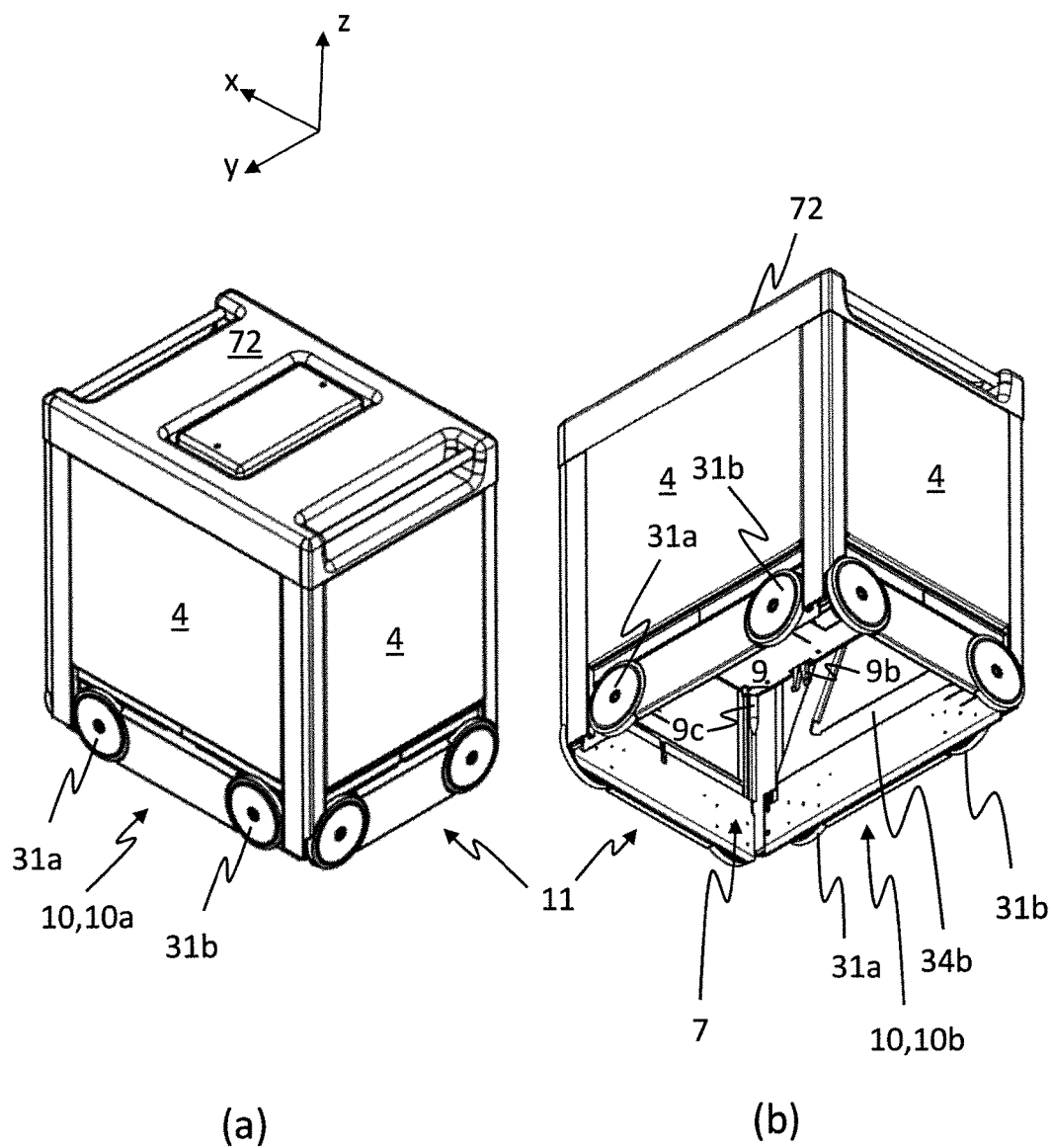
FIGS. 13 (a) and (b) are perspective views in two different angles of a remotely operated vehicle according to a third embodiment of the invention.

A third embodiment according to the invention is shown in FIGS. 13-16, where FIGS. 13 (a) and (b) show the inventive vehicle 1 comprising a top cover 72 (non-removable or removable), a vehicle body/framework 4 covering all sides in the X,Y directions, a first set of vehicle rolling means 10,10a,31a,31b and a second set of vehicle rolling means 11. FIG. 13 (b) also shows part of the cavity 7 and part of the lifting device 9 with its lifting grips 9b and guiding pins 9c.

Figure 14:
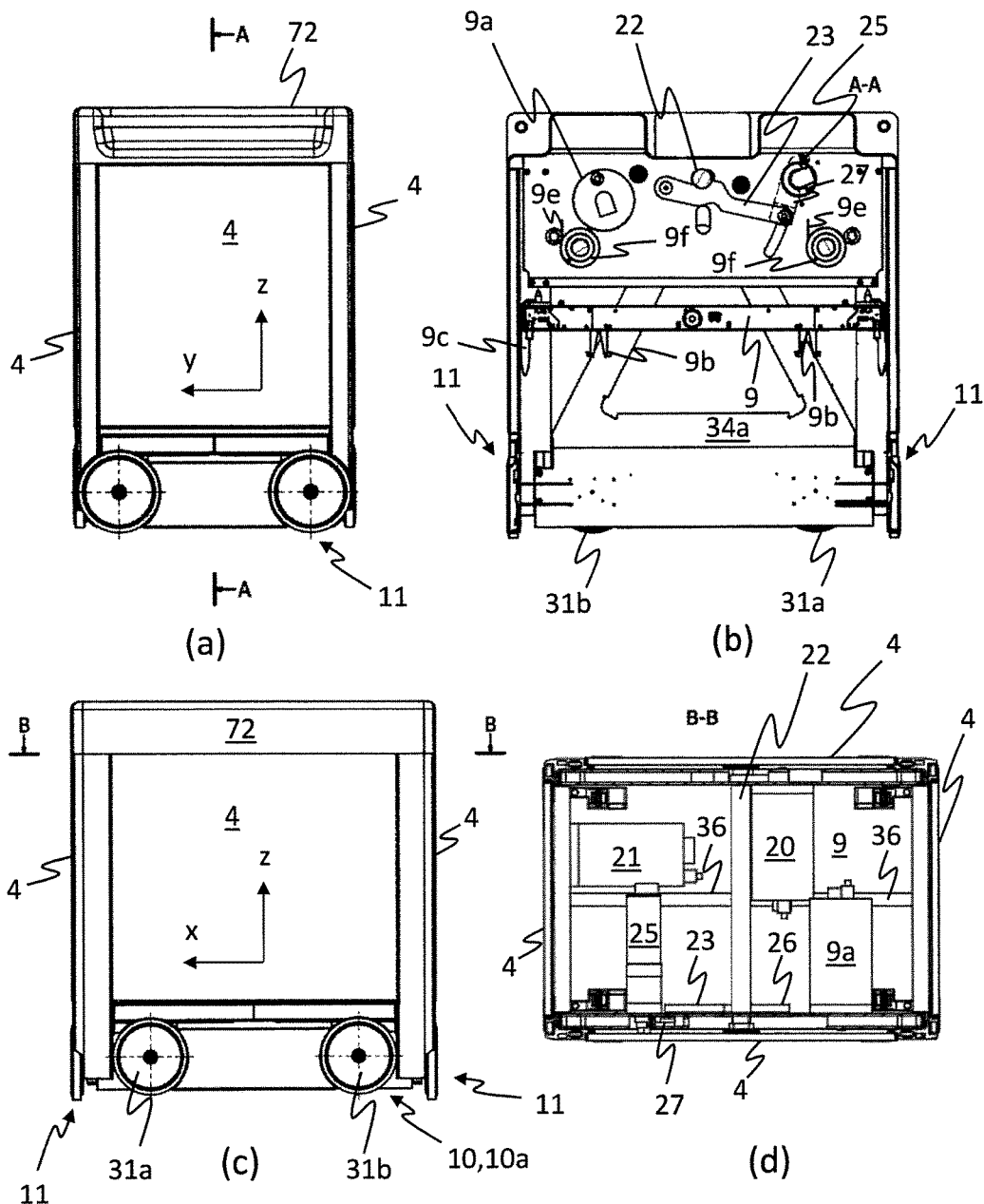
FIGS. 14 (a) to (d) are side views of the remotely operated vehicle according to FIG. 13, where FIG. 14 (a) shows the vehicle seen along x direction with casing, FIG. 14 (b) shows a cross section of the vehicle along the section A-A of FIG. 14 (a), FIG. 14 (c) shows a side view of the vehicle seen along the y direction and FIG. 14 (d) shows a cross section of the vehicle along the section B-B of FIG. 14 (c)

FIGS. 14 (a) and (c) show side views observed along x direction and y direction, respectively, of the third embodiment vehicle shown in FIG. 13. Cross sectional views along section A-A of FIG. 14 (a) and section B-B of FIG. 14 (c) are shown in FIGS. 14 (b) and (d), respectively, revealing internal components of the vehicle 1. As for the second embodiment shown in FIG. 10 (b) the second displacement plate 34b extends from the upper part 4u of the vehicle body 4 to the lower edge of the vehicle 1, including the slave wheels 31,31a,31b (FIG. 15). In addition to the lifting device 9 with its vehicle lifting device motor 9a, lifting grips 9b and guiding pins 9c, FIG. 14 (b) also shows lifting device sheaves 9f and lifting device belt 9g used to lift and lower the lifting device 9. As for the second embodiment and best seen in the exploded and non-exploded drawing in FIGS. 15 (a) and (b), respectively, a plurality of first lifting device bars 9d are connected to each of the lifting device sheaves 9f, and these bars 9d are connecting the two lateral sides of vehicles 1 upper part 4u along the y direction. Further, as seen in FIG. 15 (a) the lifting device belts 9g connect the sheaves 9b and bars 9d to one or more second lifting device bars 9e, which again is in rotary connection with the vehicle lifting device motor 9a. Hence, rotation of the second lifting device bars 9e causes a rotation of the first lifting device bars 9d and sheaves 9f via the lifting device belts 9g, resulting in the desired lifting/lowering of the lifting device 9,9b,9c. The belts connecting the first lifting device bars 9d with the lowered/lifted part are not shown.

The first set of wheels 10 which is configured to be lowered/lifted to/from the rails 13 in order to change direction is mounted together on a common frame. In FIGS. 15 (a) and (b) this frame corresponds to the first and second displacement plates 34a,34b. Both in the second and third embodiments this common frame is rigidly fixed to the displaceable bar 22, thereby enabling vertical displacement by the pivoting the lever arm 23 as described earlier. The common frame may advantageously comprise guiding means/wheels situated at its lower edge in order to facilitate the vertical displacements. However, in contrast to the second embodiment the third embodiment does not necessitate the use of any master wheel 30 to exert rotational force on the first and/or second set of wheels 10,11. The driving means 10,11 may obtain their driving force in lateral (X,Y) direction by the utilization of one or more motors integrated within the driving means, for example by installing rotor magnets within each wheels 10,11, or by installing separate belts/chains extending from driving motors situated in the upper part 4u of the framework 4 to the driving means 10,11, or a combination thereof.

Figure 16:
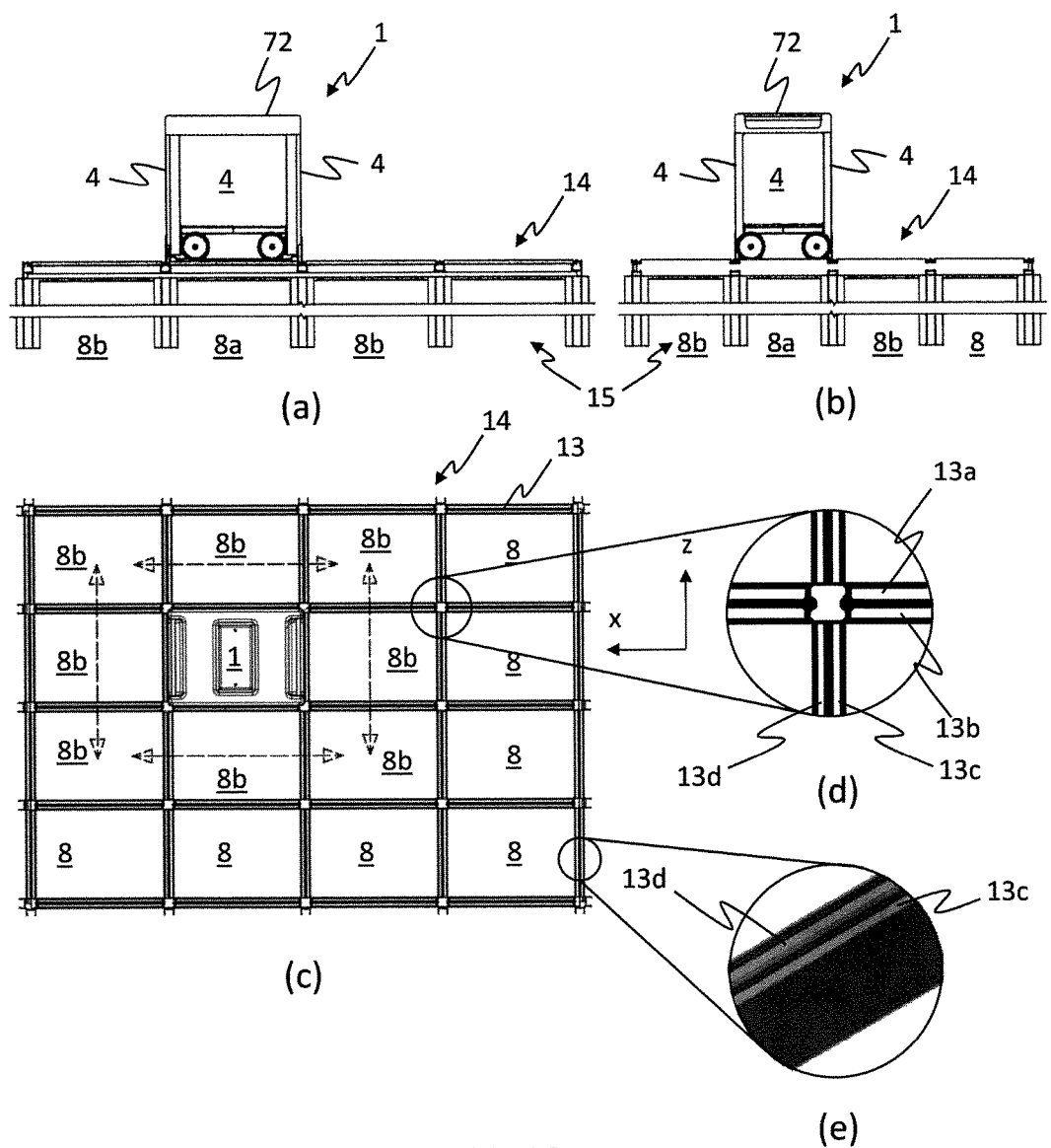

The vehicle 1 in accordance with the third embodiment is in FIG. 16 (a)-(e) shown arranged on double track rails 13 constituting at least part of the vehicle support 14. In FIGS. 16 (a), (b) and (c) the vehicle 1 is shown positioned directly above a central column 8a. As is in the second embodiment the lateral cross sectional area of the vehicle 1 occupies exactly, or almost exactly, the lateral cross sectional area of the underlying column 8,8a,8b. The lateral cross sectional area may of course be smaller or larger than the lateral cross sectional area of the column 8. However, vehicles 1 with a cross sectional area covering a single cell in the storage system, combined with use of double track rails 16 (c)-(e), has the advantage of allowing vehicles 1 to pass/cross at all four lateral sides while maintaining optimized stability. FIGS. 16 (d) and (e) show in further details the double track rails 13, where FIG. 16 (d) shows a top view of a cross-over of such double track rails 13 comprising a first and second X-rail 13a,13b directed along the X direction and a third and fourth Y-rail directed along the Y direction, while FIG. 16 (e) shows a perspective side view of part of the double track rail 13 directed along the Y direction.

Figure 17:
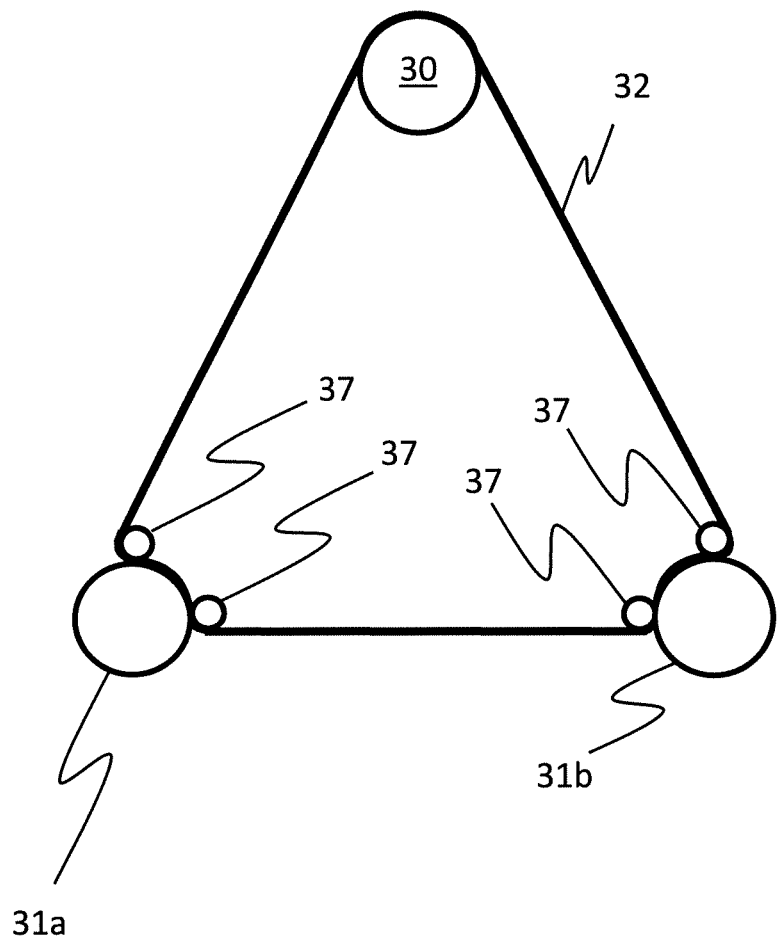
FIG. 17 shows a principal sketch of the wheel configuration at one side walls of the remotely operated vehicle according any one of the embodiments.

In FIGS. 5-12 the belt 32 interconnecting the master wheel 30 and the slave wheels 31 is shown to completely enclose all wheels 30,31. This configuration is easy to implement and cost effective. However, since the belt 32 is situated between the rotation point of the slave wheels 31a,31b and the underlying storage system 3 the downward directed force may be weakened by dynamic forces, for example during acceleration/deceleration of the vehicle 1. In order to at least mitigate this potential weakening, an alternative driving means configuration is proposed where one or more smaller auxiliary wheels 37, for example two auxiliary wheels, are arranged adjacent at least some, preferably all, of the slave wheels 31a,31b, and where the belt 32 is guided between the slave wheel 31a,31b and its auxiliary wheels 37. This alternative configuration, illustrated in FIG. 17, ensures a desired decrease in the risk of a downward acting pressure force weakening during operation, and thus a more predictable contact force between the slave wheels 31a,31b and the underlying storage system 3.

All operations of the vehicle/robot 1 are controlled by wireless communication means and remote control units. This includes control of the vehicle movements, the directional changes of the vehicle 1, the vehicle lifting device 9 and any registration of the vehicle positions.

In the preceding description, various aspects of the assembly according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to persons skilled in the art to which the disclosed subject matter pertains, are deemed to lie within the scope of the present invention.

LIST OF REFERENCE NUMERALS/LETTERS

1 Remotely operated vehicle assembly/robot
2 Storage bin
3 Storage system
4 Vehicle body/framework
4u Upper half of vehicle body
7 Cavity
8 Storage column
9 Vehicle lifting device
9a Vehicle lifting device motor
9b Lifting grip
9c Guiding pin
9d First lifting device bar
9e Second lifting device bar
9f Lifting device sheave
9g Lifting device belt
10 First set of vehicle rolling means/driving means
10a First part of vehicle rolling means
10b Second part of vehicle rolling means
11 Second set of vehicle rolling means/driving means
13 Supporting rail
13a First X-rail
13b Second X-rail
13c First Y-rail
13d Second Y-rail
14 Vehicle support
15 Bin storing structure/bin storing grid
20 Driving motor for driving vehicle in X direction
21 Driving motor for driving vehicle in Y direction
22 Displaceable bar
23 Lever arm
25 Displacement motor
25a Rotor of displacement motor
26 First rotatable device/rotatable bolt/fulcrum
27 Locking means/locking arm
28 Second rotatable device/lever arm wheel
30 Upper rotating unit/Master wheel
31 Lower rotating unit/Slave wheel
31a Laterally spaced apart wheel/first slave wheel
31b Laterally spaced apart wheel/second slave wheel
32 Cord/rope/belt
33 Slots
34a First displacement plate
34b Second displacement plate
35 Drive shaft, X direction
36 Drive shaft, Y direction
37 Auxiliary wheel
50 Bin lift device
60 Delivery station / port
72 Top cover
Δz Displacement length

The invention claimed is:
1. A remotely operated vehicle assembly for picking up storage bins from an underlying storage system, comprising:
a vehicle body displaying a cavity for receiving a storage bin within the storage system
a vehicle lifting device connected to the vehicle body for lifting the storage bin into the cavity,
driving means comprising:
a first set of vehicle wheels connected to the vehicle body allowing movement of the vehicle along a first direction within the storage system during use, and
a second set of vehicle wheels connected to the vehicle body allowing movement of the vehicle along a second direction in the storage system during use, the second direction being perpendicular to the first direction,
a displacement arrangement coupled to the driving means comprising
a displacement motor configured to provide power to displace at least one of the first set of vehicle wheels and
the second set of vehicle wheels means
between
a displaced state where the first or second set of vehicle wheels is displaced away from the underlying storage system during use, and
a non-displaced state where the first or second set of vehicle wheels is in contact with the underlying storage system during use,
wherein the displacement motor is situated in a lateral plane above the cavity, and further configured to generate a power that is converted to a vertically directed pressure force acting on the first or second set of vehicle wheels.
2. The vehicle assembly in accordance with claim 1, wherein the transfer of force from the displacement motor to the corresponding first or second set of vehicle wheels is performed by means of at least one lever arm configured to allow mechanical alternation between the displaced state and the non-displaced state.
3. The vehicle assembly in accordance with claim 1, wherein
at least one set of the first and second sets of vehicle wheels comprises:
a first part and a second part being arranged at opposite facing side walls of the vehicle body, and
a vertically displaceable bar rigidly interconnecting the first part and the second part above the cavity.
4. The vehicle assembly in accordance with claim 3, wherein the displacement arrangement comprises:
at least one lever arm configured to abut the vertically displaceable bar during operation of the displacement motor.
5. The vehicle assembly in accordance with claim 4, wherein the at least one lever arm is arranged at least partly below the vertically displaceable bar.
6. The vehicle assembly in accordance with claim 4, wherein the at least one lever arm is situated at an upper half of the vehicle body.
7. The vehicle assembly in accordance with claim 1, wherein the displacement arrangement comprises:
at least one lever arm connected to at least one of the first and second sets of vehicle wheels,
wherein two ends of each lever arm are arranged on each lateral side of an impact area of the lever arm from which the vertically directed pressure force on the vehicle wheels form during operation of the displacement motor.
8. The vehicle assembly in accordance with claim 7, wherein a first end of each lever arm is connected to a first rotatable device arranged within an upper part of the vehicle body, and a second end of each lever arm is connected to the displacement motor, allowing rotation of the lever arm around its fulcrum at the first end, thereby causing a vertical displacement of the vehicle wheels.

9. The vehicle assembly in accordance with claim 8, wherein the displacement arrangement further comprises:
at least one locking means,
wherein each at least one locking means is pivotally connected to
one of the at least one lever arm at or near the second end and
a second rotatable device situated at the upper half of the vehicle body, and
wherein the at least one locking means and the second rotatable device are interconnected to allow releasable blocking of vertical movement of the one of the at least one lever arm after a predetermined angular rotation of the second rotatable device.

10. The vehicle assembly in accordance with claim 9, wherein the at least one locking means is connected to a rotor of the displacement motor.

11. The vehicle assembly in accordance with claim 1, wherein the vehicle assembly further comprises at least one driving motor situated at the lateral plane above the cavity, the driving motor being arranged to drive at least one of the first set of vehicle wheels and the second set of vehicle wheels along the lateral plane of the underlying storage system.

12. The vehicle assembly in accordance with claim 1, wherein at least one of the first and second set of vehicle wheels comprises:
a first part and a second part being arranged at opposite facing side walls of the vehicle body, and
a vertically displaceable bar rigidly interconnecting the first part and the second part at a lateral plane above the cavity,
wherein at least one of the first and second part further comprises an upper rotating unit and a lower rotating unit, the upper and lower rotating units being interconnected by a cord rendering simultaneous rotation of the units possible.

13. The vehicle assembly in accordance with claim 12, wherein the lower rotating unit comprises two laterally spaced apart wheels which wheels are configured to make releasable contact with the underlying storage system during use.

14. The vehicle assembly in accordance with claim 12, wherein the interconnecting cord encircles the lower rotating unit.

15. The vehicle assembly in accordance with claim 12, wherein the interconnecting cord is arranged outside the lower rotation unit.

16. The vehicle assembly in accordance with claim 1, wherein at least one of the first and second sets of vehicle wheels comprises:
a first part and a second part being arranged at opposite facing side walls of the vehicle body, where the first and second parts are rigidly connected to first and second displacement plates, respectively, and
a vertically displaceable bar at a lateral plane above the cavity rigidly connecting the first and second displacement plate.

17. The vehicle assembly in accordance with claim 1, wherein vertical displacement components that vertically displace the first or second set of vehicle wheels and the lifting device components are arranged above the cavity and lateral movement components that laterally move the vehicle assembly are either arranged above the cavity or within the volume limited by the spatial distribution of the parts of the first and second sets of vehicle wheels contacting the underlying storage system during operation or a combination thereof.

18. A storage system for storage of bins, comprising:
the remotely operated vehicle assembly of claim 1,
a vehicle support comprising a plurality of crossing supporting rails directed perpendicular to each other,
a bin storing structure supporting the vehicle support, the structure comprising a plurality of storage columns,
wherein each of the plurality of storage columns is arranged to accommodate a vertical stack of storage bins.

19. The storage system in accordance with claim 18, wherein the plurality of crossing supporting rails are paired to comprise: a first and second rail in the first direction and a third and fourth rail in the second direction.

20. The storage system in accordance with claim 18, wherein the lateral cross sectional area of the remotely operated vehicle assembly occupies at most the lateral cross sectional area of one of the plurality of storage columns within the bin storing structure, where the lateral cross sectional area of one of the plurality of storage columns corresponds to the lateral area limited by the distance from a first supporting rail an adjacent supporting rail parallel to the first supporting rail, the distance being measured from the centre line of each rail.

21. A method for changing direction of a remotely operated vehicle assembly when operated on an underlying storage system, the vehicle assembly comprising:
a vehicle body displaying a cavity for receiving a storage bin within the storage system, a vehicle lifting device connected to the vehicle body for lifting the storage bin into the cavity,
a displacement arrangement comprising
a displacement motor and
driving means comprising:
a first set of vehicle wheels connected to the vehicle body allowing movement of the vehicle along a first direction within the storage system during use and
a second set of vehicle wheels connected to the vehicle body allowing movement of the vehicle along a second direction in the storage system during use, the second direction being perpendicular to the first direction,
the method comprising:
rotating at least one lever arm by operating the displacement motor, where the displacement motor is situated near the upper lateral plane of the cavity, or above the cavity, and
vertically displacing one of the first set of vehicle wheels and the second set of vehicle wheels by exerting a pressure force on the first or second set of vehicle wheels in the vertical direction, away from the underlying storage system, by means of the rotating lever arm.

* * * * *

UNITED STATES PATENT AND TRADEMARK OFFICE
CERTIFICATE OF CORRECTION

PATENT NO. : 10,294,025 B2  
APPLICATION NO. : 15/319103  
DATED : May 21, 2019  
INVENTOR(S) : Ingvar Hognaland et al.

Page 1 of 1

It is certified that error appears in the above-identified patent and that said Letters Patent is hereby corrected as shown below:

On the Title Page

Item (73), under "Assignee," the location of Autostore Technology AS should read -- Nedre Vats -- rather than "Vindafjord."

Signed and Sealed this  
Twenty-sixth Day of May, 2020

Andrei Iancu  
*Director of the United States Patent and Trademark Office*